United States Patent
Amit et al.

(10) Patent No.: US 9,319,383 B2
(45) Date of Patent: *Apr. 19, 2016

(54) FIREWALL WITH TWO-PHASE FILTERING

(75) Inventors: Neta Amit, Haifa (IL); Eran Harel, Kiriat Haim (IL); Abraham Nathan, Haifa (IL); Nevet Basker, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/124,833

(22) Filed: May 9, 2005

(65) Prior Publication Data

US 2005/0210294 A1    Sep. 22, 2005

Related U.S. Application Data

(63) Continuation of application No. 09/514,461, filed on Feb. 28, 2000, now Pat. No. 6,925,572.

(51) Int. Cl.
*G06F 15/16* (2006.01)
*H04L 29/06* (2006.01)

(52) U.S. Cl.
CPC ........... *H04L 63/0245* (2013.01); *Y02T 10/862* (2013.01)

(58) Field of Classification Search
CPC ... H04L 63/08; H04L 63/083; H04L 63/0815; H04L 63/0823; H04L 63/0263; H04L 63/0227; H04L 63/02; H04L 63/029; H04L 63/0209; G06F 21/31

USPC .......................... 726/5, 11, 15; 713/151, 152; 709/238–244, 224, 229

See application file for complete search history.

(56) References Cited

U.S. PATENT DOCUMENTS

| | | | |
|---|---|---|---|
| 4,754,420 A | 6/1988 | Jensen | |
| 5,630,757 A | 5/1997 | Gagin | |
| 5,781,534 A | 7/1998 | Perlman | |
| 5,835,726 A * | 11/1998 | Shwed et al. | 709/229 |
| 5,951,651 A | 9/1999 | Lakshman | |
| 5,983,275 A * | 11/1999 | Ecclesine | 709/231 |
| 6,061,797 A * | 5/2000 | Jade et al. | 726/15 |
| 6,202,081 B1 * | 3/2001 | Naudus | 709/200 |
| 6,317,838 B1 * | 11/2001 | Baize | 726/11 |
| 6,925,572 B1 | 8/2005 | Amit | |
| 7,096,498 B2 | 8/2006 | Judge | |

* cited by examiner

*Primary Examiner* — Baotran N To
(74) *Attorney, Agent, or Firm* — Kate Drakos; Aneesh Mehta; Micky Minhas

(57) ABSTRACT

Two-phase filtering for a firewall is disclosed. In the first, general phase, a request is filtered to verify one or more of: that the request is pursuant to a supported protocol, that a command of the request is allowed, that the length of the request does not exceed the allowed maximum for the command, and that characters of the request are of an allowable type. Upon first-phase verification, a second phase is invoked that is particular to the protocol of the request. In the second, specialized phase, the request is filtered to verify one or more of the source, the destination, and the content of the request. Upon second-phase verification, the request is allowed to pass. If either first- or second-phase verification fails, then the request is denied.

20 Claims, 3 Drawing Sheets

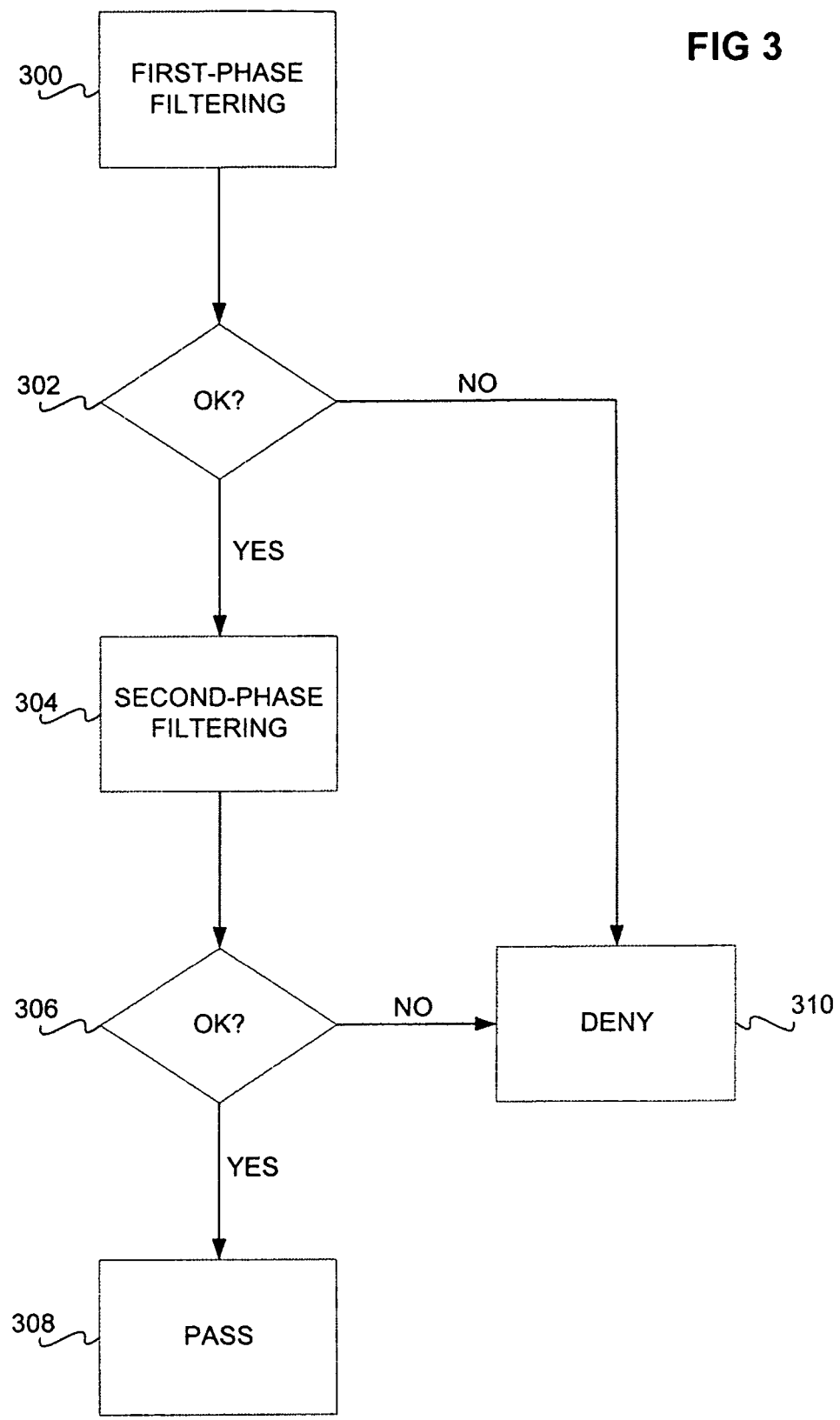

FIREWALL WITH TWO-PHASE FILTERING

REFERENCE TO RELATED APPLICATION

This is a continuation of U.S. patent application Ser. No. 09/514,461, which was filed on Feb. 28, 2000, and is hereby incorporated herein by reference.

FIELD OF THE INVENTION

This invention relates generally to firewalls that perform filtering, and more specifically to such filtering that is two-phase.

BACKGROUND OF THE INVENTION

The Internet has become increasingly popular, allowing business users and consumers to interact with one another. However, security has become an increasing concern with use of the Internet. Especially for businesses, which may allow Internet connectivity to their private networks, there is the threat of hackers gaining access to such private networks through the Internet. To ward off these malicious attacks, many administrators of networks are using mechanisms that are designed to protect the networks against such attacks.

One such mechanism is the firewall, a combination of hardware and software usually located between a private network and the Internet gateway for the network. Requests for information over the Internet from nodes within the network are routed through the firewall. Likewise, information received from the Internet is first received at the firewall before being distributed to the appropriate node(s) on the private network. Thus, the firewall is able to monitor, inspect and filter all requests bound for or incoming from the Internet, to ensure that outgoing requests adhere to stated policies, and incoming requests are not malicious attacks on the network the server is designed to protect.

Within the prior art, firewalls generally perform one-phase filtering. That is, all Internet-bound and Internet-incoming traffic is received at a single level at the firewall before going on to its true destination. However, because the number of protocols used for Internet communication is increasing, and because the number of different types of attacks that can be lodged against a network from over the Internet is also increasing, the complexity of firewalls is correspondingly increasing as well. Such complexity itself is, unfortunately, also a point of weakness, because as the firewall becomes more complex, the developers are less likely to be able to determine a priori every possible manner by which access can be improperly granted by the firewall.

For this and other reasons, therefore, there is a need for the present invention.

SUMMARY OF THE INVENTION

The invention relates to a firewall with two-phase filtering. In general, the firewall is located between an internal network, such as a local-area network (LAN), and an external network, such as the Internet, that can pose risks to the internal network. It may also be used to segment networks into secure and unsecure portions, or to apply different levels of security or policy to different parts of the network. The firewall can be a part of a server (that is, an application-level firewall), a personal firewall installed on a client machine, a firewall appliance (that is, a hardware device primarily dedicated for this purpose), etc.; the invention is not so limited.

In the first phase, a request is filtered to verify one or more of: that the request is pursuant to a supported protocol, that a command of the request is allowed, that the length of the request does not exceed the allowed maximum for the command, and that characters of the request are of an allowable type. Upon first-phase verification, a second phase is performed that is particular to the protocol to which the request is pursuant. In the second phase, the request is filtered to verify one or more of the source, the destination, and the content of the request. Upon second-phase verification, the request is allowed to pass to the internal (secure) network. If either first- or second-phase verification fails, then the request is denied.

Embodiments of the invention provide for advantages not found within the prior art. The first phase is compact and simple, because the checks it performs are limited. As a result, the first phase is less vulnerable to attacks that exploit complexity weaknesses, as within the prior art. The first phase is the phase that is seen by the outside world—that is, by the Internet. Only if the first phase verification passes is the second phase invoked, which is a specialized phase particular to the protocol of the request, and which can be more complex with less worry that its complexity is a point of weakness of the firewall.

It is noted that in one embodiment of the invention, the second-phase filter can be an instance of a specialized protocol processor, such as a computer program or a server dedicated to this purpose. For example, the second-phase filter can be built upon an existing and known, and thus likely solid, foundation, depending on its architecture, such as a derivation of an existing protocol processor, an instance of an existing protocol processor, an extension of an existing protocol processor, combinations of a derivation, instance, and/or extension, etc. Thus, a large part of the complexity of the second-phase filter may already be accomplished, by the developers, likely experts, who originally developed the protocol processor, rendering the filter more functional and less prone to bugs and other problems. Furthermore, building the filter based upon an existing and known foundation reduces development time thereof.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like; refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
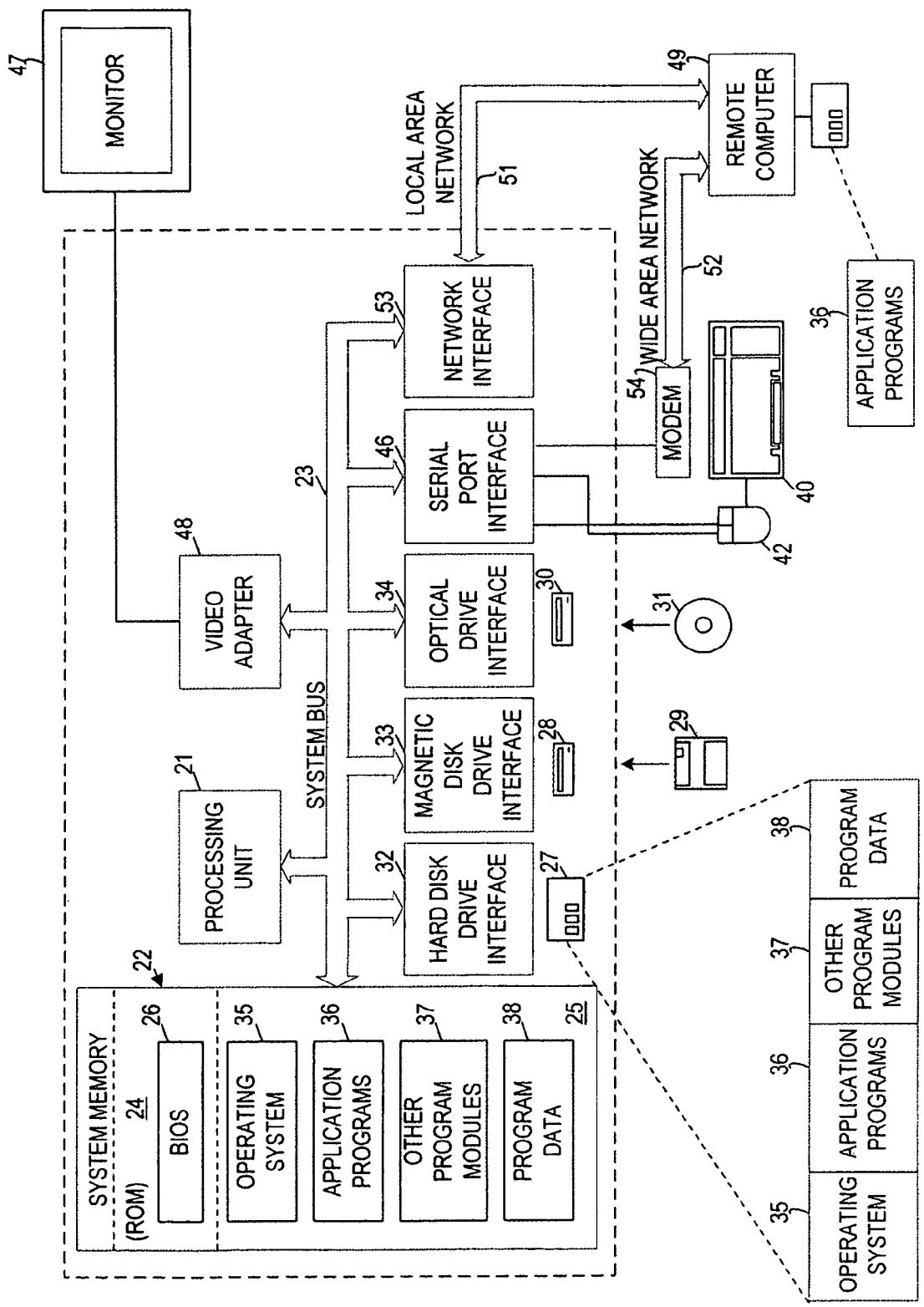
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer, including a processing unit 21, a system memory 22, and a system bus 23 that operatively couples various system components include the system memory 22 to the processing unit 21.

There may be only one or there may be more than one processing unit 21, such that the processor of computer comprises a single central-processing unit (CPU), or a plurality of processing units, commonly referred to as a parallel processing environment. The computer may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory 22 may also be referred to as simply the memory, and includes read only memory (ROM) 24 and random access memory (RAM) 25. A basic input/output system (BIOS) 26, containing the basic routines that help to transfer information between elements within the computer, such as during start-up, is stored in ROM 24. The computer further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus 23, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer may operate in a networked environment using logical connections to one or more remote computers, such as remote computer 49. These logical connections are achieved by a communication device coupled to or a part of the computer; the invention is not limited to a particular type of communications device. The remote computer 49 may be another computer, a server, a router, a network PC, a client, a peer device or other common network node, and typically includes many or all of the elements described above relative to the computer, although only a memory storage device has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer is connected to the local network 51 through a network interface or adapter 53, which is one type of communications device. When used in a WAN-networking environment, the computer typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer, or portions thereof, may be stored in the remote memory storage device. It is appreciated that the network connections shown are exemplary and other means of and communications devices for establishing a communications link between the computers may be used.

System

In this section of the detailed description, a description is provided of a system according to an embodiment of the invention. The description is presented in conjunction with FIG. 2, which is a diagram of such a system. The system 200 of FIG. 2 includes the Internet 202, a first-phase general filter 204, a plurality of second-phase specialized filters 206, and a network 208. The Internet 202 is used for illustrative purposes as one type of public network that the filter 204 and the filters 206 administer access thereto and therefrom. However, the invention is not so limited. The network 208 can be any type of network, such as a local-area network (LAN), a wide-area network (WAN), an extranet, an intranet, or combinations thereof. The network 208 is in one embodiment a private network, such that the filters 204 and 206 protect the network 208 from malicious attacks coming from the Internet 202.

The filter 204 receives a request from over the Internet 202, and is designed to verify only one or more of the following: 1) that the request is pursuant to a protocol supported by the filter 204; 2) that the command of the request is allowable; 3) that the length of the request does not exceed a predetermined allowable maximum for the command of the request; and, 4) that the characters of the request are of an allowable type. In one embodiment, the filter 204 verifies all of the above. The protocols that can be supported by the filter 204 are not limited by the invention, and include such protocols as HyperText Transport Protocol (HTTP), File Transfer Protocol (FTP), Simple Mail Transport Protocol (SMTP), etc., as known within the art. Such protocols are typically used in conjunction with the Transmission Control Protocol (TCP)/Internet Protocol (IP) also known within the art. Allowable requests of commands of such protocols, typical allowable maximum lengths of such requests, and typical allowable character types of such requests, are also known by those of ordinary skill within the art.

The filtering of a request performed by the filter 204 is a limited and thus simple filtering. It only filters at most the above four items described in the previous paragraph. It does not attempt to filter the content of the request, for example. As a result, the filter 204 is general and compact, and has little complexity that may be compromised by a malicious hacker attempting to gain illicit access to the network 208 from over the Internet 202.

Upon verification by the first-phase filter 204, the request is passed to one of the second-phase specialized filters 206. The filters 206a, 206b, . . . , 206n are such that there is a filter 206 for each protocol supported by the filter 204. The request is thus passed to the filter 206 for the supported protocol to which the request itself is pursuant. The filters 206 are more complex and specialized than the filter 204, and are designed to verify one or more of: the source, the destination, and the content of the request, relative to the supported protocol to which a filter 206 relates. Thus, in particular, the second-phase filters 206 are able to perform specific content filtering of requests with respect to the protocols that they represent, as known within the art. Because the filters 206 are less exposed to the Internet 202 as compared to the filter 204, any underlying complexity of such filters 206 does not cause a significant decrease in security of the overall architecture. Upon verification by the appropriate filter 206 to which the request was passed by the filter 204, the filter 206 passes the request to the network 208 (i.e., to a node thereof). Otherwise, the request is denied; similarly, if verification fails at the filter 204, the request is denied.

Each of the filter 204 and the filters 206 can in one embodiment be likened to a mechanism for providing network security. Each mechanism can in one embodiment be a computer program executed by a processor of a computer, such as the computer described in the preceding section of the detailed description, from a computer-readable medium, such as hard disk drive or a memory, thereof. Furthermore, in one embodiment, each of the firewall and the servers can correspond to a different means for performing its particular functionality as described in the preceding paragraphs.

In one embodiment, the filter 204 and the filters 206 are implemented within a single firewall computer, such as a computer as described in the previous section of the detailed description. In another embodiment, the filter 204 can be implemented within a firewall computer, such as a component thereof, while one or more of the filters 206 can be implemented within another server computer. In still another embodiment, the filter 204 and the filter 206 are each implemented on a different server computer—for example, the filter 204 on a firewall computer, and each filter 206 on a separate additional server. Furthermore, in object-oriented programming contexts, each of the second-phase filters 206 can be a particular instance of a corresponding server object. For example, where there is an SMTP server on the network 208 that is an instantiation of an SMTP server object, the filter 206 for SMTP can be another instantiation of such a server object.

Figure 2:
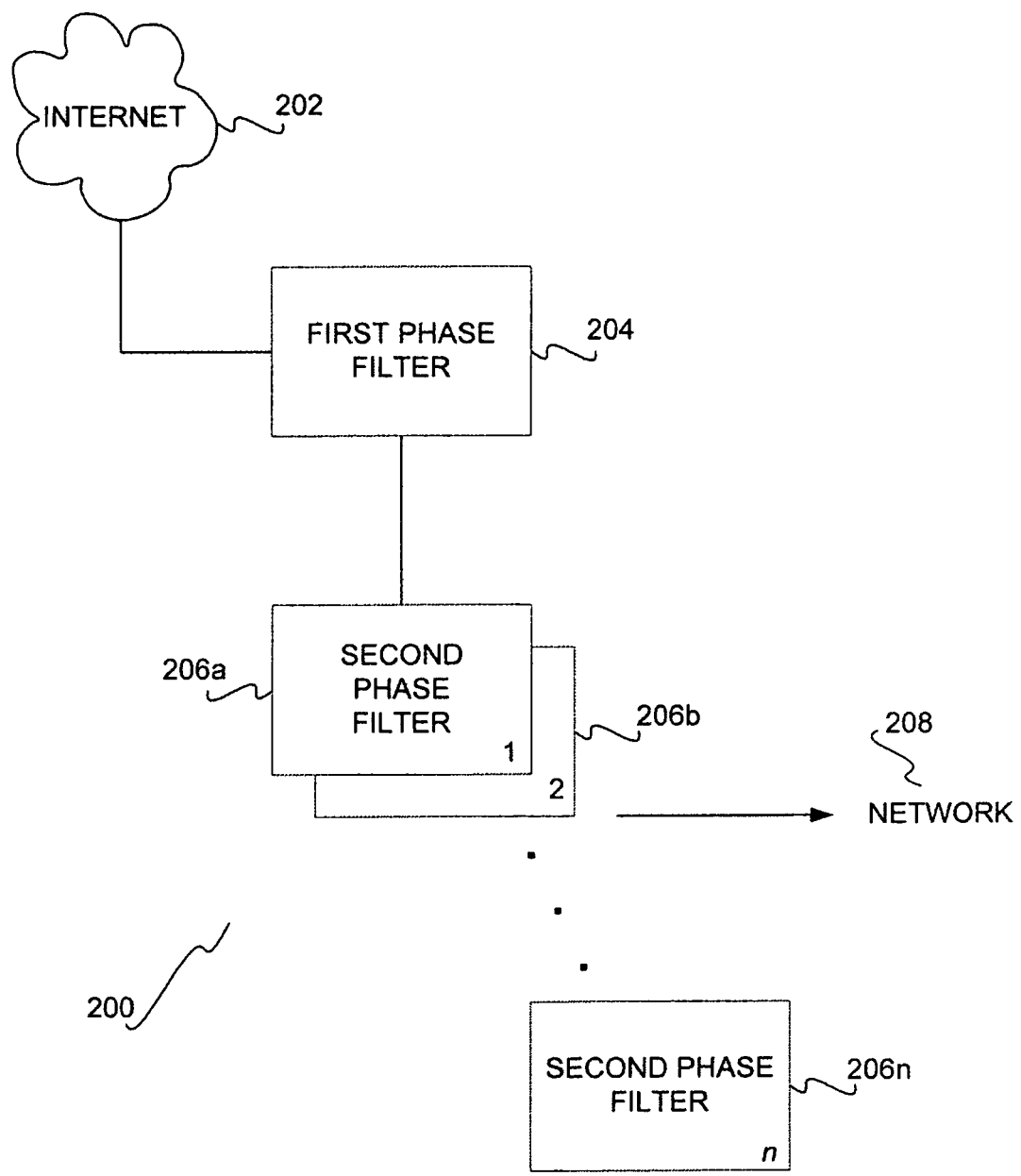
FIG. 2 is a diagram of a system according to an embodiment of the invention; and, FIG. 3 is a flowchart of a method according to an embodiment of the invention.

Thus, the operation of the system 200 of FIG. 2 is as follows: A request pursuant to a protocol and including a command is received from the Internet 202 by the first-phase filter 204. The first-phase filter 204 verifies one or more of: that the protocol is supported; that the command is allowable; that the request's length does not exceed a predetermined allowable maximum; and that the characters of the request are of an allowable type. If the request passes this verification, then the first-phase filter 204 passes the request to the particular second-phase filter 206 that corresponds to the protocol to which the request is pursuant. The second-phase filter 206 verifies one or more of: the source, the destination, and the content of the request. Upon verification by the second-phase filter 206, the request is allowed to enter the network 208. If verification fails at either the filter 204 or the particular second-phase filter 206, then the request is denied and not allowed to enter the network 208.

It is noted that as has been described herein, embodiments of the invention filter incoming traffic—that is, data entering the internal network from the external network. However, the invention itself is not so limited. For example, other embodiments of the invention can filter outgoing traffic—that is, data originating from the internal network and bound for the external network. For example, the second-phase filter for the Simple Mail Transport Protocol (SMTP) can be used to: change the "from:" line of an e-mail to not reveal servers inside the company; add a line of text to a message, such as a company logo, a company policy; etc. The invention is not so limited.

Method

In this section, methods of varying embodiments of the invention are described. In some embodiments, the methods are computer-implemented. The computer-implemented methods can be realized at least in part as one or more programs running on a computer—that is, as a program executed from a computer-readable medium such as a memory by a processor of a computer, such as the computer shown in and described in conjunction with FIG. 1. The programs are desirably storable on a machine-readable medium such as a floppy disk or a CD-ROM, for distribution and installation and execution on another computer. The methods described herein can be implemented in conjunction with the system of the previous section of the detailed description, in one embodiment of the invention.

Referring to FIG. 3, a flowchart of a method according to an embodiment is shown. In 300, a request that can in one embodiment originate from a network such as the Internet is filtered. The request is pursuant to a particular protocol, and includes a command. The filtering in 300 is a first-phase filtering, and verifies only one or more: 1) that the protocol is a supported protocol; 2) that the command is allowable; 3) that the length of the request does not exceed a predetermined allowable maximum for the command; and, 4) that characters of the request are of allowable types. If the request passes this verification, then the method proceeds from 302 to 304; otherwise, the method proceeds from 302 to 310, where the request is denied, and is not allowed to pass the firewall to the private network to which the request is intended to go.

In 304, a second-phase filtering is performed on the request. The filtering performed in 304 is particular to the protocol to which the request is pursuant. The filtering performed in 304 is therefore more complex than the filtering performed in 300, and verifies at least one of: the source of the request, the destination of the request, and the content of the request, relative to the protocol to which the request is pursuant. For example, there may be different firewall filtering with respect to a request related to SMTP than a request related to HTTP. If the request passes this verification, then the method proceeds from 306 to 308, where the request is allowed to pass to the private network to which it is intended to go; otherwise, the method proceeds from 306 to 310, and the request is denied, and not allowed to pass to the private network.

CONCLUSION

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the claims and equivalents thereof.

We claim:

1. A method comprising:
   receiving, by a computer, a request that originates from a first network and that is destined for a second network;
   first filtering, by a first-phase filter operating on the computer, the received request, where the first filtering comprises first verifying whether or not a protocol of the received request conforms to a protocol of a plurality of protocols that are supported by the first-phase filter;
   first denying the received request in response to the first verifying that the protocol of the received request does not conform to the supported protocol of the plurality of supported protocols, where the first denying comprising not allowing the received request to pass from the first network via the computer to the second network;
   second filtering, by a second-phase filter in response to the first verifying that the protocol of the received request conforms to the supported protocol of the plurality of supported protocols, the received request, where the second filtering comprises second verifying whether or not content of the received request conforms to the supported protocol of the plurality of supported protocols;
   second denying the received request in response to the second verifying that the content of the received request does not conform to the supported protocol of the plurality of supported protocols, where the second denying comprising not allowing the received request to pass from the first network via the computer to the second network; and
   passing, in response to the second verifying that the content of the received request does conform to the supported protocol of the plurality of supported protocols, the received request from the first network via the computer to the second network.

2. The method of claim 1 where the first verifying comprises determining that any command of the received request is allowable according to the supported protocol of the plurality of supported protocols.

3. The method of claim 1 where the first verifying comprises determining that any characters of the received request are allowable according to the supported protocol of the plurality of supported protocols.

4. The method of claim 1 where the second-phase filter is configured to operate on a second computer.

5. The method of claim 1 where the second-phase filter is one of a plurality of second-phase filters.

6. The method of claim 1 where the second verifying comprises verifying a source of the received request relative to the supported protocol of the plurality of supported protocols.

7. The method of claim 1 where the second verifying comprises verifying a destination of the received request relative to the supported protocol of the plurality of supported protocols.

8. At least one memory device that is not a signal or carrier wave per se, where the memory device comprises computer-executable instructions that, based on execution by at least one computer, configure the at least one computer to perform actions comprising:
   receiving, by a computer, a request that originates from a first network and that is destined for a second network;
   first filtering, by a first-phase filter, the received request, where the first filtering comprises first verifying whether or not a protocol of the received request conforms to a protocol of a plurality of protocols that are supported by the first-phase filter;
   first denying the received request in response to the first verifying that the protocol of the received request does not conform to the supported protocol of the plurality of supported protocols, where the first denying comprising not allowing the received request to pass from the first network via the computer to the second network;
   second filtering, by a second-phase filter in response to the first verifying that the protocol of the received request conforms to the supported protocol of the plurality of supported protocols, the received request, where the second filtering comprises second verifying whether or not content of the received request conforms to the supported protocol of the plurality of supported protocols;

second denying the received request in response to the second verifying that the content of the received request does not conform to the supported protocol of the plurality of supported protocols, where the second denying comprising not allowing the received request to pass from the first network via the computer to the second network; and passing, in response to the second verifying that the content of the received request does conform to the supported protocol of the plurality of supported protocols, the received request from the first network via the computer to the second network.

9. The at least one memory device of claim 8 where the first verifying comprises determining that any command of the received request is allowable according to the supported protocol of the plurality of supported protocols.

10. The at least one memory device of claim 8 where the first verifying comprises determining that any characters of the received request are allowable according to the supported protocol of the plurality of supported protocols.

11. The at least one memory device of claim 8 where the second-phase filter is one of a plurality of second-phase filters.

12. The at least one memory device of claim 8 where the second verifying comprises verifying a source of the received request relative to the supported protocol of the plurality of supported protocols.

13. The at least one memory device of claim 8 where the second verifying comprises verifying a destination of the received request relative to the supported protocol of the plurality of supported protocols.

14. A system comprising:
at least one processor;
memory that comprises a received request that originated from a first network and that is destined for a second network;
a first-phase filter configured for first verifying whether or not a protocol of the received request conforms to a protocol of a plurality of protocols that are supported by the first-phase filter;
the system configured for first denying the received request in response to the first verifying that the protocol of the received request does not conform to the supported protocol of the plurality of supported protocols, where the first denying comprising not allowing the received request to pass from the first network via the system to the second network;

a second-phase filter configured for second verifying, in response to the first verifying that the protocol of the received request conforms to the supported protocol of the plurality of supported protocols, whether or not content of the received request based on at least one additional characteristic of the incoming request conforms to the supported protocol of the plurality of supported protocols;

the system further configured for second denying the received request in response to the second verifying that the content of the received request does not conform to the supported protocol of the plurality of supported protocols, where the second denying comprising not allowing the received request to pass from the first network via the system to the second network; and the system further configured for passing, in response to the second verifying that the content of the received request does conform to the supported protocol of the plurality of supported protocols, the received request from the first network via the system to the second network.

15. The system of claim 14 where the first verifying comprises determining that any command of the received request is allowable according to the supported protocol of the plurality of supported protocols.

16. The system of claim 14 where the first verifying comprises determining that any characters of the received request are allowable according to the supported protocol of the plurality of supported protocols.

17. The system of claim 14 wherein the first-phase filter and the second-phase filter are configured for operating on different computers.

18. The system of claim 14 where the second-phase filter is one of a plurality of second-phase filters.

19. The system of claim 14 where the second verifying comprises verifying a source of the received request relative to the supported protocol of the plurality of supported protocols.

20. The system of claim 14 where the second verifying comprises verifying a destination of the received request relative to the supported protocol of the plurality of supported protocols.

* * * * *